United States Patent [19]
Adachi

[11] 3,803,032
[45] Apr. 9, 1974

[54] METHOD FOR INSOLUBILIZING WATER SOLUBLE CHROMATE IN CHROME WASTE RESIDUE

[75] Inventor: Shinichi Adachi, Kanazawa, Japan

[73] Assignee: Nippon Denko Co., Ltd., Tokyo, Japan

[22] Filed: Feb. 2, 1972

[21] Appl. No.: 222,946

[30] Foreign Application Priority Data
Feb. 16, 1971 Japan.................................. 46-6478

[52] U.S. Cl........................ 210/37, 210/50, 210/63
[51] Int. Cl................................................. C02c 5/04
[58] Field of Search............ 210/24, 29, 37, 39, 40, 210/50, 63, 71, 56; 252/421, 422, 425, 444, 445

[56] References Cited
UNITED STATES PATENTS

| | | | |
|---|---|---|---|
| 3,619,420 | 11/1971 | Kemmer et al. | 210/40 X |
| 2,632,738 | 3/1953 | Hassler et al. | 252/421 |
| 3,591,449 | 7/1971 | Hess et al. | 210/63 X |
| 3,595,742 | 7/1971 | Hess et al. | 210/71 X |
| 2,920,050 | 1/1960 | Blacet et al. | 252/444 X |
| 3,676,365 | 7/1972 | Shirai et al. | 252/445 X |

Primary Examiner—Samih N. Zaharna
Assistant Examiner—Thomas G. Wyse
Attorney, Agent, or Firm—Cushman, Darby & Cushman

[57] ABSTRACT

Harmful water soluble chromate contained in water-leached residue from roasted product obtained by the alkali oxidizing roasting of chrome ore can be insolubilized and fixed in said residue by mixing lumpy and/or powdery water-leached residue with organic materials capable of being converted into active carbon, roasting the mixture in a gaseous atmosphere of low oxygen concentration at a gas temperature of 400–1,000°C and a material temperature of 400–700°C, and thereafter quenching the roasted product. Said organic materials include pulp waste liquor, sawdusts, chaffs, pulp sludge and lignite.

7 Claims, 1 Drawing Figure

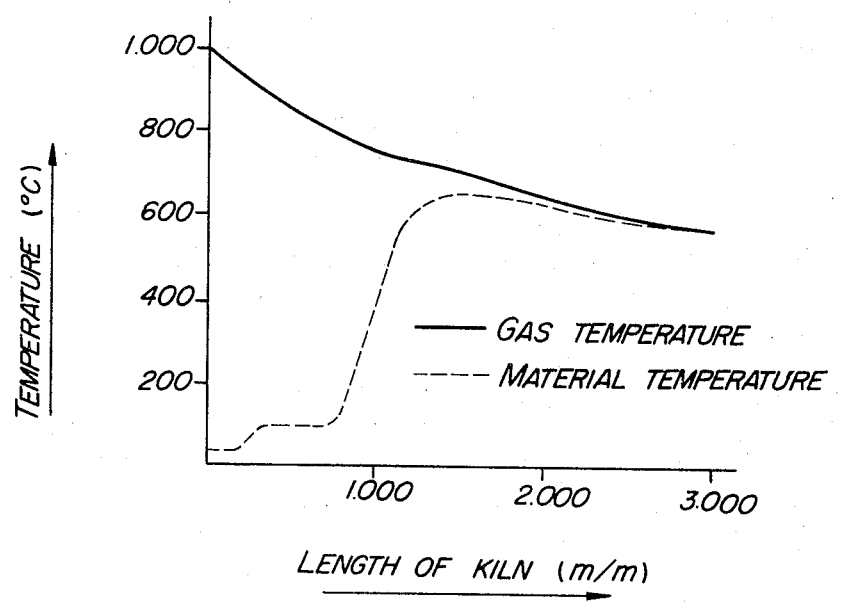

METHOD FOR INSOLUBILIZING WATER SOLUBLE CHROMATE IN CHROME WASTE RESIDUE

The present invention relates to a method for insolubilizing harmful water soluble chromate contained in water-leached residue (referred to as "chrome waste residue" hereinafter) from roasted product obtained by the alkali oxidizing roasting of chrome ore and fixing the chromate in the chrome waste residue. The chrome waste residue in which the water soluble chromate is thus insolubilized can be disposed into earth without polluting life environment because there is no possibility of the harmful hexavalent chrome being dissolved out.

Generally, chromate chemicals have been commercially produced from an aqueous solution of sodium chromate as a starting material. Said aqueous solution of sodium chromate can be obtained by the alkali oxidizing roasting of chrome ore and leaching the roasted product with water. The residue from leaching necessarily contains about 0.3–1.5 percent of harmful chromates. According to the conventional disposal method by which said harmful chromates containing residues are directly disposed into earth, the chromates are gradually dissolved out with rainwater or ground water. They flow out on the surface of the earth or pollute the rivers. That is, there is a possibility of the environmental pollution.

The present invention relates to a method for insolubilizing chromates in chrome waste residue characterized in that organic materials capable of being converted into active carbon are mixed with lumpy and/or powdery chrome waste residue, the mixture is roasted in a gas atmosphere having a low oxygen concentration and then the roasted product is quenched.

More particularly, the present invention is characterized in that at least one of organic materials capable of being converted into active carbon such as pulp waste liquor (SP or KP waste pulp liqour), sawdusts, chaffs, lignite and pulp sludge are added to chrome waste residue in a wet lumpy and/or powdery state having a particle size of less than 30 mm and containing water soluble chromates, if necessary, Glauber's salt or zinc chloride being further incorporated thereinto, then the mixture is roasted in a gaseous atmosphere having an oxygen concentration of less than 2 percent in, for example, a co-current type rotary kiln while keeping a gas temperature of 400°–1,000°C and a material temperature of 400°–700°C and immediately thereafter the roasted product is quenched by dipping it in water or distributing water thereon, whereby harmful chromate contained in chrome waste residue is water insolubilized to fix the chromate in the residue.

According to the method of the present invention, chrome waste residue which is formed in an amount of about 1 ton per ton of sodium bichromate in commercial production of chromate chemicals can be safely and economically disposed without causing environmental pollution.

Chrome waste residue contains about 40 percent of calcium oxide as shown in the table of chrome waste residue in Examples hereinafter and the residual water soluble chromate is contained mainly in the form of calcium chromate. Calcium chromate has a high chemical affinity and complete reduction of the chromate cannot be attained by reduction roasting in carbon monoxide gas atmosphere at lower than 1,000°C. Therefore, said CO reduction roasting method cannot be employed as countermeasure against environmental pollution which must be completely prevented. If the CO reduction roasting is carried out at a temperature of 1,000°–1,300°C, insoluble chrome oxide and calcium oxide contained in the residue are bonded with a slight amount of oxygen in the gaseous atmosphere to produce calcium chromate and conversely water soluble chromate is increased.

In order to reduce calcium chromate by reduction roasting method, carbonaceous reducing agent such as cokes in an excess amount which greatly exceeds the theoretical amount of carbon required for reducing iron oxide and chromate in chrome waste residue is allowed to coexist in the chrome waste residue and then the residue can be subjected to heat reduction treatment at a temperature of higher than 1,000°C. However, for economical reason, such reduction roasting method can be employed with difficulty. temperature The present invention provides an extremely effective method according to which chrome waste residue containing difficultly fixable water soluble chromate can be economically and safely disposed into the earth. Thus, the method of the present invention is markedly effective as a countermeasurement against environmental pollution. Furthermore, the present invention has the characteristic that inexpensive materials such as pulp waste liquor obtained in the paper making industry or waste materials obtained in agriculture and forestry industries can be utilized and moreover, the invention can be worked at a low roasting temperaute (material temperature) of lower than 700°C, whereby the treating cost can be lowered.

The method of the present invention will be specifically explained below.

A wet chrome waste residue after subjected to leaching with water having a particle size of less than about 15 mm$\phi$ (which may contain a small amount of particles having the size of 15 mm$\phi$–30 mm$\phi$) is employed as the chrome waste residue to be treated. Organic materials capable of being converted into active carbon such as pulp waste liquor, sawdust, chaffs, powdery lignite, pulp sludge, etc. are mixed with said chrome waste slag. In case of using sawdust, chaffs, powdery lignite, pulp sludge, it is necessary to add Glauber's salt or zinc chloride as an activating agent in the presence of water to completely accomplish the object of the present invention. Said additives are added to the chrome waste residue and they are well mixed. The mixture is charged in a co-current type rotary kiln and is roasted in an atmosphere having a low oxygen concentration of lower than 2 percent at a gas temperature of 400°–1,000°C and a material temperature of 400°–700°C. The atmosphere of low oxygen concentration is necessary for minimizing combustion loss of the organic materials capable of being converted into active carbon and for surely attaining the effects of the present invention. Thus, a weak oxidizing atmosphere or reducing atmosphere may be employed. Specifically, an atmosphere of carbon monoxide, carbon dioxide, steam or nitrogen or mixture gas thereof is preferred. Especially, the steam atmosphere is preferable because addition of a smaller amount of the organic materials may be sufficient in this atmosphere.

The reason for limitation of the lower limit of the material temperature to 400°C is that the effect of the present invention cannot be attained when the temperature is lower than 400°C. The material temperature of 700°C is the upper limit at which the maximum effect can be attained with addition of a small amount of carbon and when the temperature exceeds 700°C, combustion of carbon takes place with a small amount of oxygen to cause shortage of carbon, whereby complete fixing of water soluble chromate cannot be attained. Chrome waste residue, if it has a particle size of less than 30 mm, can be used in a lumpy form. Of course, it may be used in a powder form.

The attached drawing shows distributions of combustion gas temperature and material temperature in a co-current type rotary kiln when amount of materials supplied is 40 kg/hr.

Of course, kilns other than the co-current type rotary kiln may be used, but the latter is preferable because (1) the material temperature can be made less than the gas combustion temperature, (2) oxygen concentration can be automatically controlled, and (3) continuous treatment in a large amount can be attained.

Then, the roasted product is immediately quenched by dipping it in water or scattering water thereon. The water soluble chromate in the chrome waste residue thus obtained has been insolubilized and even if thus insolubilized chromate is left in water, thus treated chrome waste residue is not dissolved out at all. Therefore, the chromate can be buried in the earth without causing any environmental pollution. The quenching of the roasted product by dipping it in water or scattering water thereon is essential for fixing chromate in the chrome waste residue. When said quenching is omitted or is not properly carried out, the effect of the present invention cannot be obtained.

Active carbon per se may also be used in the present invention to obtain sufficiently good result, but it cannot be industrially employed for economical reason.

EXAMPLE 1

A muffle kiln which can control concentration and compositions of gas in atmosphere was used as a roasting apparatus. Properties and compositions of the materials used are as follows:

1. Chrome waste residue

| Particle size | Cr | Water soluble Cr | CaO | MgO | FeO |
|---|---|---|---|---|---|
| Less than 20 meshes | 3.84% | 0.71% | 38.81% | 8.39% | 17.39% |

| $Al_2O_3$ | $SiO_2$ | Water |
|---|---|---|
| 20.95% | 4.65% | 21.3% |

2. SP pulp waste liquor

| Specific gravity | Water | Lignin (as ligninsulfonic acid) |
|---|---|---|
| 1.25 | 50% | 20% |

| Sugar | Ca (as CaO) | S (as $SO_2$) | PH |
|---|---|---|---|
| 17% | 6% | 7% | 3 |

3. KP pulp waste liquor

| Specific gravity | Water | PH |
|---|---|---|
| 1.18 | 60% | 12.7 |

The composition was not known.

4. Sawdusts

Undried sawdusts of miscellaneous trees.

5. Chaffs

These were used as they were.

6. Lignite

| Particle size | Fixed carbon | Ash | Volatile matter |
|---|---|---|---|
| Less than 80 meshes | 62.30% | 4.85% | 32.85% |

Given amounts of chrome waste residue and additives were well mixed. The mixture was placed in a large evaporating dish made of alumina and was roasted for a given period of time in a muffle kiln and immediately after completion of roasting, the roasted product was taken out and quenched by dipping it in water. The treating conditions and the results thereof are shown below.

| Experiment No. | | 1 | 2 | 3 | 4 | 5 | 6 | 7 | 8 | 9 |
|---|---|---|---|---|---|---|---|---|---|---|
| Blending (Parts) | Chrome waste residue | 50 | 50 | 50 | 50 | 50 | 50 | 50 | 50 | 50 |
| | Powdered active carbon | 10 | | | | | | | | |
| | SP pulp waste liquor | | 15 | 15 | | | | | | |
| | KP pulp waste liquor | | | | | | 15 | | | |
| | Sawdust (wood powder) | | | 4 | 12 | | 4 | | | |
| | Chaff | | | | | 12 | | | | |
| | Pulp sludge | | | | | | | 5 | | |

| Experiment No. | | 1 | 2 | 3 | 4 | 5 | 6 | 7 | 8 | 9 |
|---|---|---|---|---|---|---|---|---|---|---|
| Roasting conditions | Lignite | | | | | | | 5 | 10 | |
| | Sodium Sulfate | | | | 15 | 15 | | 15 | | 15 |
| | Zinc chloride | | | | | | | | 10 | |
| | Water | 30 | | | 30 | 30 | | 10 | 10 | 10 |
| | Gas temperature (°C) | 800 | 800 | 400 600 1000 | 800 | 800 | 800 | 800 | 800 | 800 |
| | Material temperature (°C) | 400 700 | 400 700 | 400 700 | 400 700 | 400 700 | 400 700 | 400 700 | 400 700 | 400 700 |
| | Time (minute) | 60 | 60 | 60 | 60 | 60 | 60 | 60 | 60 | 60 |
| | Atmosphere in kiln | steam | steam | steam | steam | steam | steam | steam | steam | CO gas |
| Roasted products | Color of water in which product was dipped | colorless | colorless | colorless | light green | colorless | colorless | bluish green | bluish green | bluish green |
| | Presence of swelling | no | yes | no | no | no | no | no | no | no |

When the roasted products were dipped in water, the water of Experiment Nos. 4, 7, 8 and 9 displayed light green or bluish green. These colorations were not due to dissolving out of chromate, but due to dissolving out of organic components. Said color could be easily removed by adding a small amount of sulfuric acid to said water.

The roasted product of Experiment No. 2 was in a swollen state. It seems that this is because when pulp waste liquor of high viscosity is added, the mixture is swollen at the initial stage of roasting step at which temperature is elevated. The swelling of the product was easily avoided by using sawdusts together with the pulp waste liquor as shown in Experiment Nos. 3 and 6.

Water was used for blending to make easy the physical mixing of the wet chrome waste residue and additives when this is difficult.

Aqueous solution of chromate, when it contains more than 1 ppm of hexavalent chrome, turns yellow. Therefore, when water in which the roasted product is dipped is colorless, it may be considered that the desired object has been attained.

EXAMPLE 2

In this Example, chrome waste residue, SP pulp waste liquor and sawdusts which are shown in Example 1 were used.

An externally heating type rotary kiln of 300 mm in diameter and 2,700 mm in length was used as the roasting apparatus. Carbon dioxide was introduced thereinto from material discharging end to keep the carbon dioxide atmosphere having extremely low oxygen concentration.

As the roasting conditions, a roasting temperature of 780°–750°C, a material temperature of 600°–700°C, and a roasting time of 90 minutes and an introduction rate of material of 4.5 kg/hr (dry measure) were employed.

Carbon dioxide was introduced at a rate of 7 kg/hr under introduction pressure of 0.5 kg/cm². The atmosphere in the kiln comprised 91–14 percent of $CO_2$, 1 percent of $O_2$ and 8–5 percent of $N_2$.

Firstly, 20 kg of sawdusts were mixed with 40 kg (30 kg in terms of dry measure) chrome waste residue ground into less than 10 meshes. Six kilograms of SP pulp waste liquor was further added to the mixture and they were mixed for 10 minutes. Thus obtained mixture was continuously introduced into said rotary kiln.

A water tank was provided at directly under the discharging end of the rotary kiln so that the roasted product was dipped in water immediately after discharged.

Water in which the roasted product was dipped was utterly colorless and substantially no water soluble chromate in thus treated chrome waste residue was detected. Thus, it was confirmed that the water soluble chromate was fixed.

EXAMPLE 3

1. Chrome waste residue

| Particle size | Cr (%) | Water soluble Cr (%) | CaO (%) | MgO (%) | FeO (%) |
|---|---|---|---|---|---|
| Less than 30 mm in diameter | 3.84 | 0.71 | 38.81 | 8.39 | 17.39 |

| $Al_2O_3$ (%) | $SiO_2$ (%) | Water (%) |
|---|---|---|
| 20.95 | 4.65 | 21.3 |

The chrome waste residue mainly composed of those in 3 – 15 mm in diameter.

2. SP pulp waste liquor

| Specific gravity | Water (%) | Lignin (as ligninsulfonic acid) (%) |
|---|---|---|
| 1.25 | 50 | 20 |

| Sugar (%) | Ca (as CaO) (%) | S (as SO$_2$) (%) | PH |
|---|---|---|---|
| 17 | 6 | 7 | 3 |

3. KP pulp waste liquor

| Specific gravity | Water (%) | PH |
|---|---|---|
| 1.18 | 60 | 12.7 |

The compositions were not known.

4. Sawdusts
  Undried sawdusts of miscellaneous trees.
5. Chaff
  Chaff ground by a drying fret mill.
6. Lignite

| Particle size | Fixed carbon (%) | Ash (%) | Volatile Matter (%) |
|---|---|---|---|
| Less than 80 meshes | 62.30 | 4.85 | 32.85 |

1. Experimental method of rotary kiln

| | |
|---|---|
| Gradient | 3/100 |
| Length | 3,000 mm |
| Diameter | 300 mm |
| Rotating number | 0.27–1.08 R.P.M. |
| Type | Co-current type |

2. Conditions for operation of kiln

| | | |
|---|---|---|
| Gas temperature | | |
| Charging end of kiln | 1,000°C ± 50°C | |
| Discharging end of kiln | 500°C ± 50°C | |
| Compositions of waste gas | CO$_2$ | 10–15 volume% |
| | O$_2$ | 0.2–1.5 volume% |
| | CO | 1–3 volume% |
| Hold-up | 11–15% | |

3. Blending

1. In case of SP pulp waste liquor and KP pulp waste liquor
  Chrome waste residue and SP pulp waste liquor or KP pulp waste liquor were separately introduced into a kiln in a fixed amount, wherein they were continuously mixed.

| | |
|---|---|
| Chrome waste slag | 100 parts |
| SP pulp waste liquor or KP pulp waste liquor | 10 parts |

2. In case of lignite

| | |
|---|---|
| Chrome waste residue | 100 parts |
| Lignite | 20 parts |
| Glauber's salt or zinc chloride | 5 parts |
| Water | 30 parts |

The above were well mixed by a mixer and continuously introduced into a kiln in fixed amounts.

3. In case of sawdusts

| | |
|---|---|
| Chrome waste slag | 100 parts |
| Sawdusts | 20 parts |
| Glauber's salt or zinc chloride | 5 parts |
| Water | 40 parts |

The above were well mixed by a mixer and continuously introduced into a kiln in fixed amounts.

4. In case of chaffs

| | |
|---|---|
| Chrome waste slag | 100 parts |
| Chaffs (powder) | 20 parts |
| Glauber's salt or zinc chloride | 5 parts |
| Water | 40 parts |

The chaffs were dried and ground by a fret mill. The above were well mixed by a mixer and continuously introduced into a kiln in fixed amounts.

4. Quenching with water
  1. The roasted product was quenched by dipping it in water.
  2. The roasted product was quenched by water shower in such an extent that the roasted product was wetted.

Results of Experiment

| | Experiment No. | 1 | 2 | 3 | 4 | 5 | 6 | 7 | 8 |
|---|---|---|---|---|---|---|---|---|---|
| | Chrome Waste residue | 100 | 100 | 100 | 100 | 100 | 100 | 100 | 100 |
| | SP pulp waste liquor | 10 | | | | | | | |
| | KP pulp waste liquor | | 10 | | | | | | |
| Blending (Parts) | Sawdusts (wood powder) | | | | 20 | 20 | | | |
| | Chaffs | | | | | | 20 | 20 | |
| | Lignite | | | | | | | 20 | 20 |
| | Glauber's salt | | | 5 | | 5 | | 5 | |
| | Zinc chloride | | | | 5 | | 5 | | 5 |
| | Water | 25 | 25 | 40 | 40 | 40 | 40 | 30 | 30 |
| Gas temperature | Charging end of kiln | | | | 1,000°C | | | | |
| | Discharging end of kiln | | | | 400 – 550°C | | | | |

| | Experiment No. | 1 | 2 | 3 | 4 | 5 | 6 | 7 | 8 |
|---|---|---|---|---|---|---|---|---|---|
| Roasting conditions | Material roasting temperature | 500 – 700°C | | | | | | | |
| | Composition of $CO_2$ waste gas | 10 – 15 vol% | | | | | | | |
| | do. $O_2$ | 0.2 – 1.5 vol% | | | | | | | |
| | do. CO | 1 – 3 vol% | | | | | | | |
| | do. $H_2O$ | 2 – 5 vol% | | | | | | | |
| Roasted products | Water soluble Cr % | Trace | | | | | | | |
| | Color of water | Colorless | | | | | | | |
| | Presence of swelling | No | | | | | | | |

What is claimed is:

1. A method for insolubilizing a chromate contained in a chrome waste residue which comprises mixing the chrome waste residue in wet state with organic materials capable of being converted into active carbon, roasting said mixture in a gaseous atmosphere of oxygen concentration below 2 percent at a gas temperature of 400° to 1,000°C and a material temperature of 400° to 700°C and immediately thereafter quenching the roasted product with water.

2. A method according to claim 1, wherein the organic material is pulp waste liquor.

3. A method according to claim 1 wherein there is used at least one organic material selected from the group consisting of sawdusts, chaffs, lignite and pulp sludge together with Glauber's salt or zinc chloride.

4. A method according to claim 1, wherein at least one of pulp waste liquor, sawdusts, chaffs, lignite and pulp sludge as the organic materials, Glauber's salt and a suitable amount of water are mixed with the chrome waste residue.

5. A method according to claim 1, wherein the chrome waste residue has the particle size of less than 30 mm.

6. A method according to claim 4 wherein the amount of chromate in the chromate waste residue is 0.3–1.5 percent.

7. A method according to claim 1 wherein the amount of chromate in the chromate waste residue is 0.3 – 1.5 percent.

* * * * *

UNITED STATES PATENT OFFICE
CERTIFICATE OF CORRECTION

Patent No. 3,803,032          Dated April 9, 1974

Inventor(s) Shinichi ADACHI

It is certified that error appears in the above-identified patent and that said Letters Patent are hereby corrected as shown below:

Claim 6, line 2, change "chromate", second occurrence, to -- chrome --.

Claim 7, line 2, change "chromate", second occurrence, to -- chrome --.

Signed and sealed this 1st day of October 1974.

(SEAL)
Attest:

McCOY M. GIBSON JR.
Attesting Officer

C. MARSHALL DANN
Commissioner of Patents